Nov. 22, 1966   F. G. HAMMERSAND   3,287,673
ATTENUATOR FOR SUPPRESSING HIGH-ORDER CAVITY RESONANCES
HAVING A TRANSVERSE ELECTRIC COMPONENT
Filed March 15, 1965

INVENTOR.
FRED G. HAMMERSAND
BY
ATTORNEY 3,287,673
ATTENUATOR FOR SUPPRESSING HIGH-ORDER CAVITY RESONANCES HAVING A TRANSVERSE ELECTRIC COMPONENT
Fred G. Hammersand, East Petersburg, Pa., assignor, by mesne assignments, to the United States of America as represented by the United States Atomic Energy Commission
Filed Mar. 15, 1965, Ser. No. 440,034
7 Claims. (Cl. 333—83)

The invention disclosed herein was made under, or in, the course of Contract No. AT (04-3)-400 with the United States Atomic Energy Commission.

The present invention relates generally to resonant cavity radio-frequency generators and more particularly to an attenuating device for suppressing spurious cavity resonances produced, for example, in the operation of klystron amplifier tubes.

In the development and construction of klystron tubes for delivering very high energies, it is necessary that strict limitations be placed on the spurious outputs generated by the klystron tubes. Radio-frequency feed-back at or near the third harmonic of the generated frequency detectable in such high energy klystron tubes has proved to be particularly undesirable. The presence of this feed-back may cause objectionable output instabilities. The feed-back appears to occur along with an objectionable amplitude modulation on the radio-frequency output pulse with detriment to the output thereof. Accordingly, it is desirable to eliminate spurious cavity resonances at or near the third harmonic of the desired operating frequency of the klystron.

The present invention therefore provides a simple and straight-forward device for suppressing the above-mentioned undesirable condition of spurious cavity resonances at or near the third harmonic of the generated frequency.

Accordingly, it is an object of the present invention to provide a high energy klystron tube capable of generating a high energy output with a minimum of spurious outputs.

It is another object of the present invention to provide means for suppressing or attenuating the spurious cavity resonances of a klystron tube at or near the third harmonic of the tube operating frequency.

It is yet another object of the present invention to provide a device, for use in a resonator cavity of a klystron tube, capable of loading and diminishing the spurious cavity resonances which occur near the third harmonic of the operating frequency of the tube.

Other objects and advantages will be apparent in the following description and claims considered together with the accompanying drawing, in which:

Figure 1:
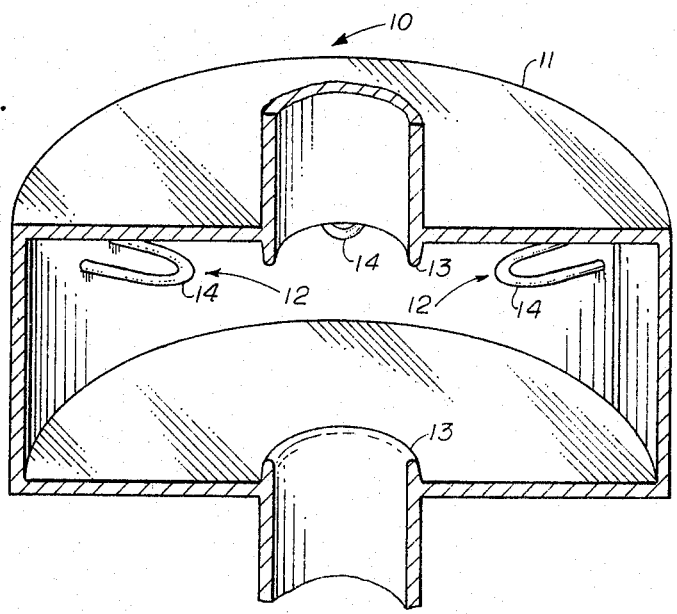
FIGURE 1 is a perspective view of the attenuator of the present invention, as utilized, for example, in a klystron resonator cavity.

Referring particularly to FIGURE 1 there is shown a cross-section view of a resonant cavity 10 of a klystron tube, exemplifying an application of an attenuator 12 of the present invention. The resonant cavity 10 is a metal-enclosed chamber 11 such as conventionally used in various types of klystron tubes as the "catcher" or "buncher" cavity. An electric field within the cavity is either produced by the microwave signal to be amplified as in the case of a "buncher" cavity in an amplifier klystron, or is induced by the beam passing therethrough as in a "catcher" cavity. Commensurate with the type of klystron in which the cavity is utilized, the beam is generally exposed to the cavity volume for only a fraction of the electric field cycle, and accordingly, the ends 13 of the "drift tubes" thereof protrude coaxially into the cavity 10 to effect the appropriate exposure time. The attenuator 12 more particularly comprises a plurality of shorted lossy loops 14 integrally secured to the inside circumference of the cavity 10 by welding or by drilling parallel holes in the wall of the cavity 10 and inserting the ends of the loops 14 therein. Accordingly, the loops 14 together with the cavity wall portions disposed between the legs of loops 14 constitute a closed circuit in which induced currents can flow. The loops 14 are secured to the cavity wall with the plane of the loops oriented in perpendicular relation to the cavity wall and to the klystron tube axis. The loops 14 are preferably formed of a "lossy" material, i.e., a metallic material which dissipates energy induced therein as eddy currents by resistive losses, such as, for example, the material known by the trademark "Kovar." Placing the loops 14 in perpendicular relation to the tube axis prevents them from loading the fundamental cavity resonance at or near the operating frequency. Such placement, however, provides effective loading of the spurious cavity resonances which occur at or near the third harmonic of the operating frequency.

The shorted loops 14, due to their orientation, couple only to cavity resonances which have a magnetic field component parallel to the cavity 10 or tube axis at or near the cavity wall. A current will flow in the loops 14 when excited by such a magnetic field. This current flow will result in $I^2R$ or power loss, and hence will load the spurious resonance. The effect then of the shorted loops 14 in accordance with the invention is to reduce the cavity Q at the spurious frequency and to minimize the stored energy at this frequency, which in turn, minimizes the velocity modulation effects of the spurious frequency on the klystron tube electron beam.

The attenuation of the spurious resonance is generally a function of the placement, the number and the geometry of the loops 14. A satisfactory configuration, as exemplified in FIGURE 1, comprises three loops secured in nonsymmetrical orientation around the inside surface of the cavity 10, within a plane passing through the cavity in perpendicular relation to the tube axis, and with the center loop spaced approximately 69° and 68° from the adjacent loops respectively. Such a nonsymmetrical configuration prevents the spurious mode pattern from shifting in an angular fashion to an unloaded position, and has been found to attenuate the spurious resonance to a satisfactory level. The exact placement of the loops is additionally, a function of other cavity parameters such as, for example, radio frequency drive loops as in the klystron input cavity, and the output iris of the klystron output cavity. The size of the loops 14 is dependent upon the attenuation requirements at spurious resonances near the third harmonic of the operating frequency, and is chosen to prevent the introduction and reinforcement of other undesirable spurious resonances at other frequencies.

In general, the attenuation of the unwanted spurious resonances around and near the third harmonic of the drive frequency is a function of the loop penetration in the cavities, i.e., the greater loop penetration the greater the attenuation. It has been found, however, that the loop penetration cannot be set arbitrarily for the maximum attenuation of the unwanted spurious resonances, since the presence of the loops in the cavities may cause the introduction of other unwanted spurious cavity resonances. As a result the loop penetration is usually adjusted for maximum attenuation of all spurious resonances beginning above the fundamental cavity resonance and ending slightly above the third harmonic frequency.

The loop configuration is preferably determined with regard to minimizing the loop inductance to maximize its radio-frequency coupling characteristics. Accordingly, the distance around the loop 14 is minimized, and as large a loop wire diameter as is practical is utilized. Hence, the loop design may include semicircular ends and straight sides as shown herein or may utilize a more circular or even rectangular configuration if desired.

Figure 2:
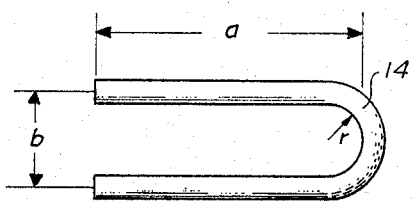
FIGURE 2 is a more detailed view of a loop of the present invention.

Referring to FIGURE 2, there is shown, by way of example only, the dimensions of a loop 14 as utilized in FIGURE 1. The loop 14 is formed of 0.060 inch diameter stock, and is bent double, with dimension $a$ equal to 0.52 inch, $b$ equal to 0.200 inch and radius $r$ equal to 0.070 inch. The ends of the loop 14, as shown in FIGURE 1, are embedded approximately 0.25 inch into matching holes in the wall of the cavity 10.

"Kovar" is an alloy consisting of 29% nickel, 17% cobalt, 0.3% manganese and the balance iron. The electrical resistivity of "Kovar" with relation to a range of temperatures is shown in the following table:

| Temperature, °C | 25 | 100 | 200 | 400 | 600 |
|---|---|---|---|---|---|
| Resistivity, microhm-cm | 49 | 62.7 | 80.4 | 107.3 | 116.6 |

"Kovar" is one of a number of glass-to-metal seal materials which have a composition of from 20% to 31% nickel, 12% to 19% cobalt, 0.2% to 0.5% manganese with the balance of the alloy being iron. Such materials are usually classed under the designation of nickel-cobalt-iron alloys in the electron tube art. Other metals and alloys having a resistivity between the fair conductors such as brass and iron and poorer semi-conductor materials adapted for elevated temperature operation in a vacuum should likewise be suitable.

For example, the following is a list of materials which may be utilized in place of the material "Kovar" hereinbefore particularly designated as the preferred material for use in making the loops 14. Included is the resistivity in microhm centimeters at 20° centigrade, and the composition where applicable, of the material.

|  | Microhm cm. |
|---|---|
| Tungsten | 5.51 |
| Nickel | 7.8 |
| Iron | 10 |
| Tantalum | 15.5 |
| Bronze (Cu 88, Sn 12) | 18 |
| Antimony | 41.7 |
| Monel metal (Ni 60, Cu 33, Fe 6.5) | 42 |
| Manganin (Cu 84, Mn 12, Ni 4) | 44 |
| Constantan (Cu 60, Ni 40) | 49 |
| Invar (Ni 35, Co .2, balance Fe) | 81 |
| "Nichrome" (Ni 60, Cr 16, balance Fe) | 100 |

It is to be understood that use of materials other than "Kovar" determines the loop 14 parameters, i.e., principally the loop wire diameter and cross-sectional area, since the energy dissipated thereby is dependent on the $I^2R$ losses of the loops. Accordingly, loops of equivalent total resistivity and of similar inductance will behave substantially similar in the structure of the invention.

Electrically conductive materials including metals and alloys thereof and suitable for use in electron tube vacuum systems having a resistivity in the range of about 5.0 to 120 microhm centimeters are suitable for use in constructing said loops. The compositions described hereinbefore are expressed in percentages by weight.

Thus while the invention has been disclosed with respect to a specific embodiment, it will be apparent to those skilled in the art that numerous variations and modifications may be made within the spirit and scope of the invention and it is not intended to limit the invention except as defined in the following claims.

What is claimed is:

1. An attenuator for suppressing spurious cavity resonances in klystron tube resonant cavities comprising a plurality of loops of a lossy conductor material integrally secured to the inner surface of the cavity wall; said loops being spaced apart in a plane passing through said cavity in perpendicular relation to the axis of the tube.

2. The attenuator in accordance with claim 1 wherein said loops comprise arcuate lengths of a resistive material capable of dissipating electrical energy.

3. The attenuator in accordance with claim 2 wherein said resistive material is selected from the group consisting of manganin, constantan, Invar, bronze and tantalum.

4. The attenuator in accordance with claim 2 wherein said resistive material comprises a metallic material which exhibits an electrical resistivity within the range of from 5.0 to 120 microhm centimeters.

5. The attenuator in accordance with claim 2 wherein said resistive material comprises an alloy of nickel and cobalt with percentages thereof on the order of from 20 to 31 and from 12 to 19 percent by weight, respectively, with the balance of the alloy comprising essentially of iron.

6. The attenuator in accordance with claim 2 wherein the number of said loops comprises 3; wherein said 3 loops are disposed in non-symmetrical orientation about the inner surface of said cavity.

7. The attenuator in accordance with claim 3 wherein said loops comprise arcuate lengths of lossy material secured to the inner wall of the cavity to extend radially inward therefrom; said loops being formed of a rod of said material of the order of 0.060 inch in diameter; wherein the loop arc radius is of the order of 0.070 inch and the loop penetration into the cavity is of the order of 0.300 to 0.350 inch.

References Cited by the Examiner

UNITED STATES PATENTS 2,591,695   4/1952   Hansen _____ 333—83

HERMAN K. SAALBACH, *Primary Examiner.*

L. ALLAHUT, *Assistant Examiner.*